United States Patent
Hirota et al.

(10) Patent No.: US 10,224,818 B2
(45) Date of Patent: Mar. 5, 2019

(54) POWER CONVERSION APPARATUS AND CONTROL METHOD FOR POWER CONVERSION APPARATUS

(71) Applicants: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

(72) Inventors: Masayoshi Hirota, Osaka (JP); Keiji Tashiro, Osaka (JP)

(73) Assignees: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

( * ) Notice: Subject to any disclaimer, the term of this patent is extended or adjusted under 35 U.S.C. 154(b) by 0 days.

(21) Appl. No.: 15/578,526

(22) PCT Filed: May 27, 2016

(86) PCT No.: PCT/JP2016/065662
§ 371 (c)(1),
(2) Date: Nov. 30, 2017

(87) PCT Pub. No.: WO2016/194790
PCT Pub. Date: Dec. 8, 2016

(65) Prior Publication Data
US 2018/0109193 A1    Apr. 19, 2018

(30) Foreign Application Priority Data

Jun. 1, 2015  (JP) ................................. 2015-111542
Jan. 12, 2016  (JP) ................................. 2016-003692

(51) Int. Cl.
*H02M 3/335* (2006.01)
*H02M 7/155* (2006.01)
(Continued)

(52) U.S. Cl.
CPC ............. *H02M 3/335* (2013.01); *H02M 1/32* (2013.01); *H02M 3/33584* (2013.01);
(Continued)

(58) Field of Classification Search
CPC ...... H02M 3/335; H02M 7/155; H02M 7/757; H02M 7/797; H02M 7/68; H02M 7/72; H02M 7/81
See application file for complete search history.

(56) References Cited

U.S. PATENT DOCUMENTS 9,762,133 B2 *  9/2017  Handa ............... H02M 3/33546
9,847,723 B2 * 12/2017  Suetomi ................... H02M 3/24
(Continued)

FOREIGN PATENT DOCUMENTS

| JP | 2007-312464 A | 11/2007 |
|---|---|---|
| JP | 2012-196089 A | 10/2012 |
| JP | 2013-110778 A | 6/2013 |

OTHER PUBLICATIONS

International Search Report issued in International Application No. PCT/JP2016/065662 dated Aug. 9, 2016.

*Primary Examiner* — Timothy J Dole
*Assistant Examiner* — Sisay G Tiku
(74) *Attorney, Agent, or Firm* — Venable LLP; Michael A. Sartori; Laura G. Remus

(57) ABSTRACT

Provided are a control unit having a first control state in which a first switching element and a second switching element of one series circuit are turned on and a second control state to which the first control state shifts and in which a first switching element of another series circuit and
(Continued)

the second switching element of the one series circuit are turned on, and executing control so as to apply predetermined voltage to the other side of a transformer during a predetermined time period during the first control state before shifting to the second control state.

12 Claims, 15 Drawing Sheets

(51) Int. Cl.
*H02M 7/757* (2006.01)
*H02M 7/797* (2006.01)
*H02M 7/68* (2006.01)
*H02M 7/72* (2006.01)
*H02M 7/81* (2006.01)
*H02M 1/32* (2007.01)
*H02M 7/219* (2006.01)
*H02M 1/00* (2006.01)

(52) U.S. Cl.
CPC ........... *H02M 7/155* (2013.01); *H02M 7/219* (2013.01); *H02M 7/757* (2013.01); *H02M 2001/007* (2013.01)

(56) References Cited

U.S. PATENT DOCUMENTS

| | | | |
|---|---|---|---|
| 2014/0103860 A1* | 4/2014 | Kominami | H02M 1/32 320/103 |
| 2014/0185345 A1* | 7/2014 | Harrison | H02M 7/53871 363/127 |
| 2015/0015181 A1* | 1/2015 | Kondo | H02M 3/33584 320/103 |
| 2015/0214847 A1* | 7/2015 | Shimada | H02J 7/0052 320/107 |
| 2016/0087545 A1* | 3/2016 | Higaki | H02J 7/0054 363/17 |
| 2016/0141972 A1* | 5/2016 | Yamada | H02M 1/32 363/37 |
| 2017/0229972 A1* | 8/2017 | Cerqueira Pinto Bezerra Varajao et al. | G01R 25/005 |
| 2017/0237354 A1* | 8/2017 | Takahara | H02M 3/33546 363/17 |
| 2017/0323721 A1* | 11/2017 | Madawala | H02J 5/005 |
| 2018/0026520 A1* | 1/2018 | Hirota | H02M 1/14 |

* cited by examiner

FIG. 2
STATE A
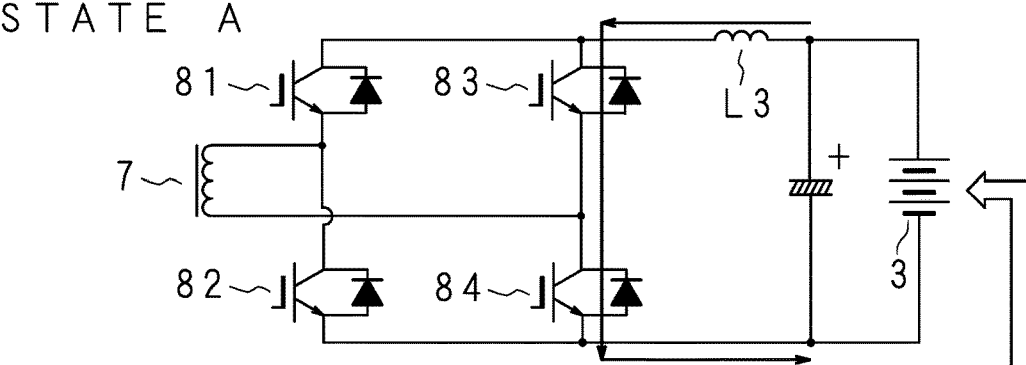
STATE B
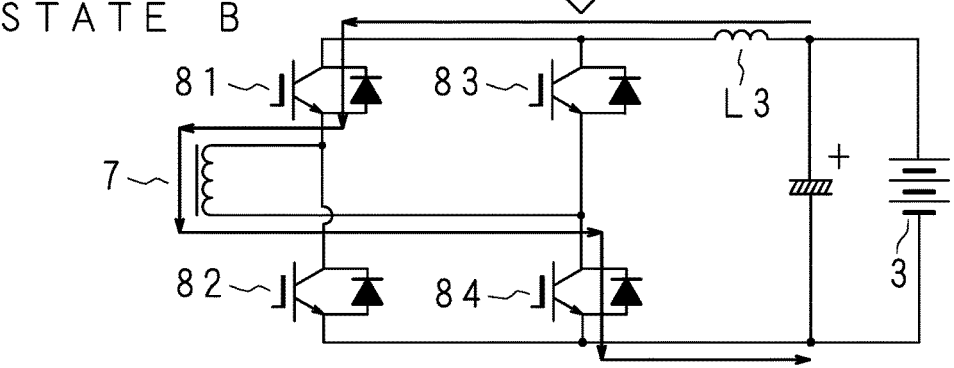
STATE C
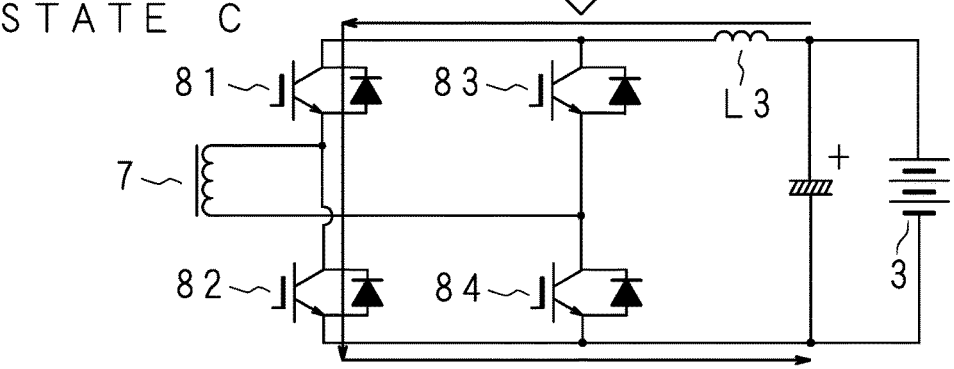
STATE D
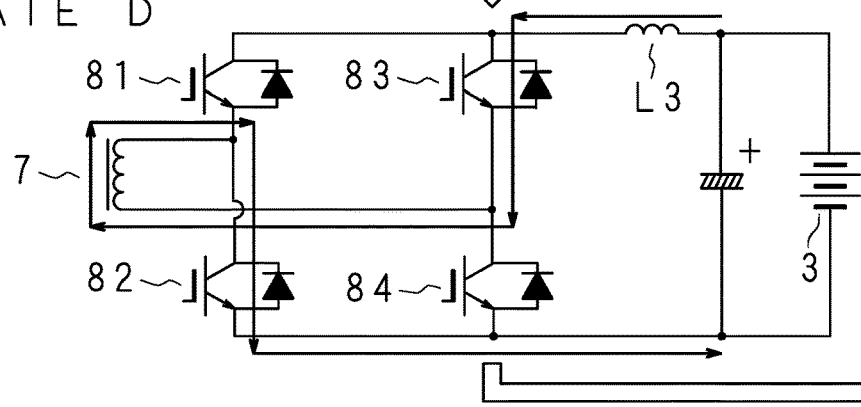

FIG. 9
STATE A
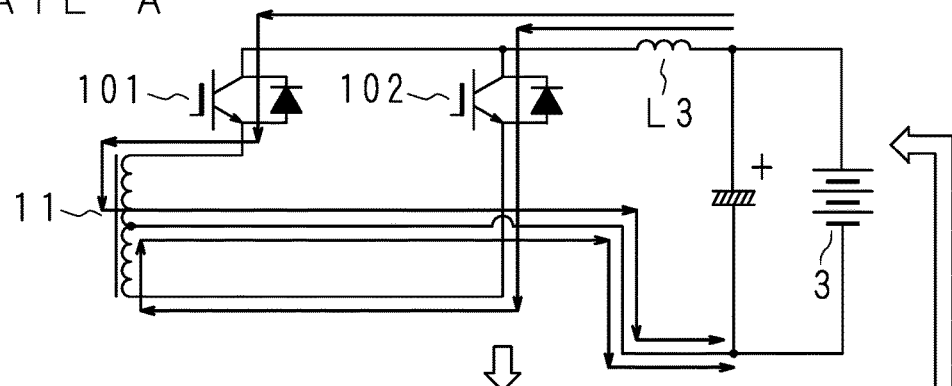
STATE B
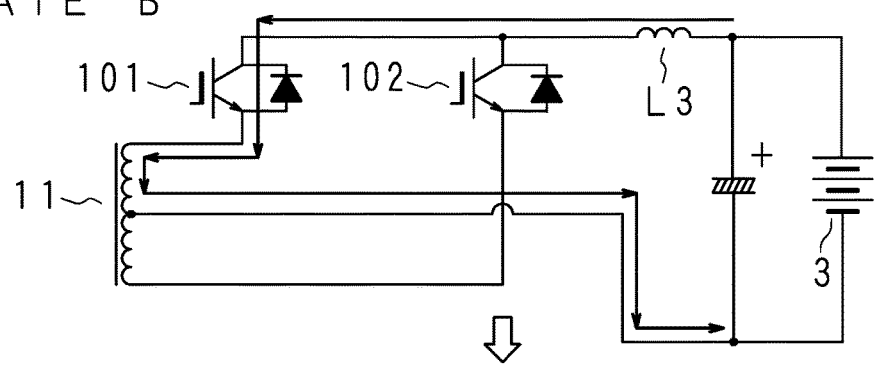
STATE C
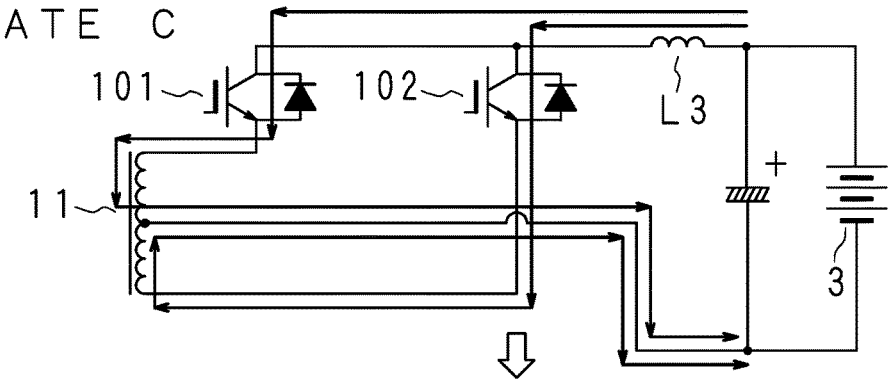
STATE D
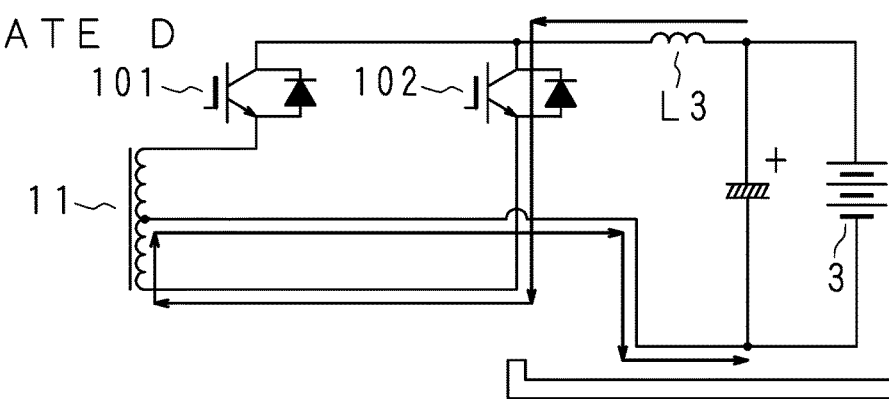

F I G. 10
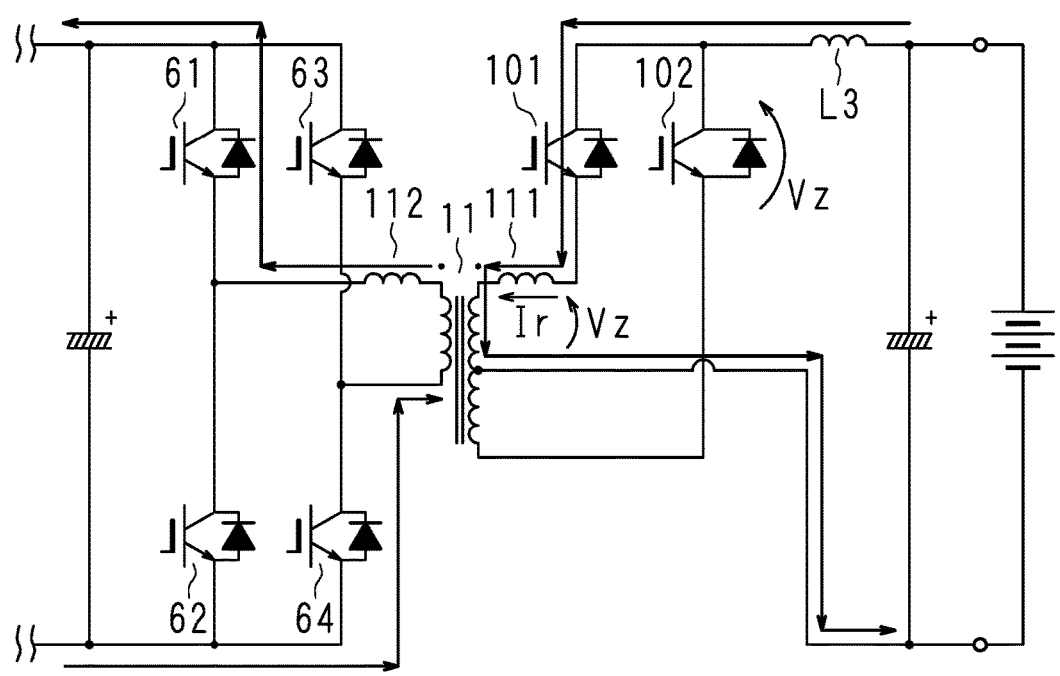

F I G. 1 2
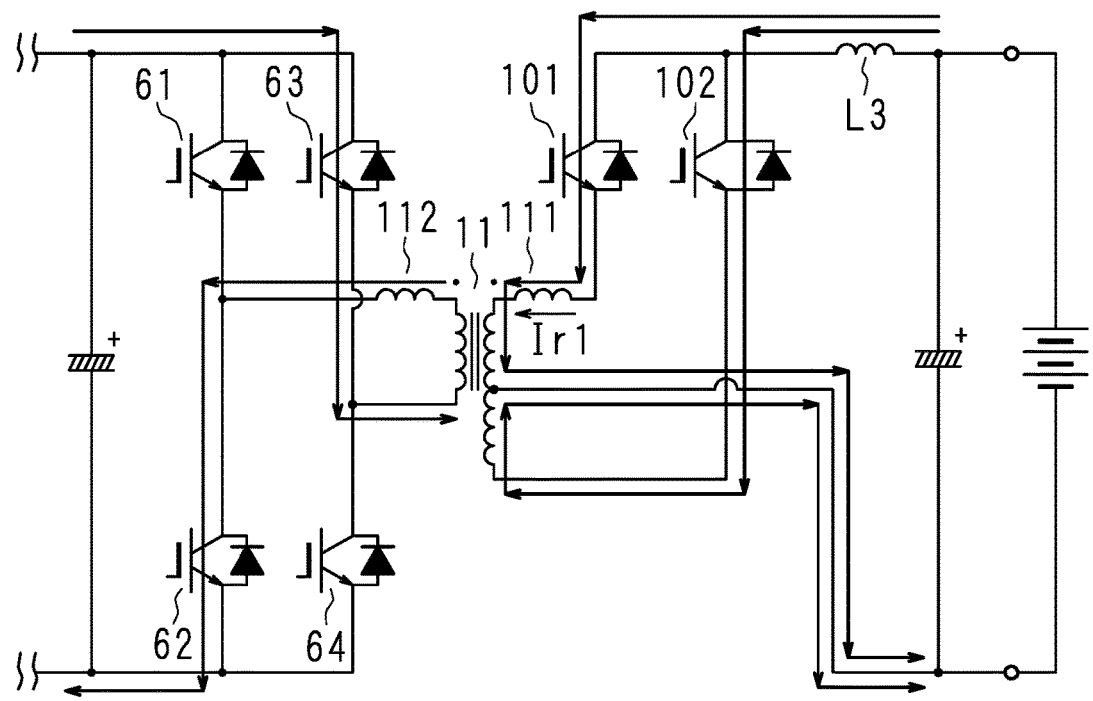

POWER CONVERSION APPARATUS AND CONTROL METHOD FOR POWER CONVERSION APPARATUS

CROSS-REFERENCE TO RELATED APPLICATIONS

This application is the national phase under 35 U.S.C. § 371 of PCT International Application No. PCT/JP2016/065662 which has an International filing date of May 27, 2016 and designated the United States of America.

FIELD

The present invention relates to a power conversion apparatus and a control method for the power conversion apparatus.

The present application claims the benefit of Japanese Patent Application No. 2015-111542 filed in Jun. 1, 2015 and Japanese Patent application No. 2016-003692 filed in Jan. 12, 2016 the disclosure of which applications are herein incorporated by reference.

BACKGROUND

A plug-in hybrid electric vehicle (PHEV) and an electric vehicle (EV) are mounted with an on-vehicle charger (for example, AC/DC converter) that can charge an on-vehicle high-voltage battery (DC side) from an electric power system (AC side). Meanwhile, expectations run high that the on-vehicle high-voltage battery is utilized as a home power source (V2H: vehicle to home) or as a buffer (V2G: vehicle to grid) for stabilizing the electric power system. This requires a bidirectional charger capable of bidirectionally converting electric power.

Such a bidirectional charger is provided with an AC-DC conversion circuit having a power factor correction (hereinafter referred to as PFC) function of converting AC to DC upon charging and an inverter function of converting DC to AC upon discharging, and a DC/DC converter.

Such a DC/DC converter has two single-phase bridge inverters and a transformer that isolates the single-phase bridge inverters. The single-phase bridge inverter has two series circuits connected in parallel, each series circuit having two switching elements connected in series (see Japanese Patent Application Laid-Open Publication No. 2012-196089).

SUMMARY

The power conversion apparatus according to an embodiment of the present disclosure comprises: a plurality of series circuits each having a first switching element and a second switching element connected in series, the series circuits being connected in parallel, one end of each of the series circuits being connected to an inductor, each of junctions of the first switching element and the second switching element being connected to one side of a transformer, and a control unit that executes control so as to turn on or off the first switching element and the second switching element at a predetermined frequency, and to convert DC supplied to the series circuits through the inductor to AC, and provide converted AC to the other side of the transformer; and the control unit executes control to obtain a first control state in which the first switching element and the second switching element of one series circuit are on, to shift from the first control state to a second control state in which the first switching element of another series circuit and the second switching element of the one series circuit are on, and to apply predetermined voltage to the other side of the transformer over a predetermined time period during the first control state before shifting to the second control state.

The power conversion apparatus according to an embodiment of the present disclosure provided with a control unit that executes control to turn on or off a first switching element and a second switching element at a predetermined frequency, comprises: an inductor connected to one end of the first switching element and one end of the second switching element; and a transformer with a winding having one end of the winding on one side of the transformer connected to the other end of the first switching element, having the other end of the winding on the one side of the transformer connected the other end of the second switching element and having a junction in a middle of the winding on the one side of the transformer, and the control unit executes control to obtain a first control state in which the first switching element and the second switching element are on, to shift from the first control state to a second control state in which either one of the first switching element or the second switching element is on, and to apply predetermined voltage to the other side of the transformer over a predetermined time period during the first control state before shifting to the second control state.

The control method for the power conversion apparatus according to an embodiment of the present disclosure provided with a plurality of series circuits each having a first switching element and a second switching element connected in series, the series circuits being connected in parallel, one end of each of the series circuits being connected to an inductor, each of junctions of the first switching element and the second switching element being connected to one side of a transformer, and the first switching element and the second switching element being turned on or off at a predetermined frequency, and to convert DC supplied to the series circuits through the inductor to AC, and provide converted AC to the other side of the transformer, comprises a first control step of turning on the first switching element and the second switching element of one series circuit by a control unit; a second control step of shifting from the first control step and turning on the first switching element of another series circuit and the second switching element of the one series circuit by the control unit, and a controlling step of executing control by the control unit to apply predetermined voltage to the other side of the transformer over a predetermined time period during the first control step before shifting to the second control step.

The control method for the power conversion apparatus according to one embodiment of the present disclosure provided with a control unit that executes control to turn on or off a first switching element and a second switching element at a predetermined frequency, an inductor connected to one end of the first switching element and one end of the second switching element, and a transformer with a winding having one end of the winding on one side of the transformer connected to the other end of the first switching element, having the other end of the winding on the one side of the transformer connected to the other end of the second switching element and having a junction in a middle of the winding on the one side of the transformer comprises a first control step of turning on the first switching element and the second switching element by the control unit; a second control step of shifting from the first control step and turning on either one of the first switching element or the second switching element by the control unit, and a controlling step of executing control by the control unit to apply predetermined voltage to the other side of the transformer over a predetermined time period during the first control step before shifting to the second control step.

The above and further objects and features of the invention will more fully be apparent from the following detailed description with accompanying drawings.

BRIEF DESCRIPTION OF THE DRAWINGS

FIG. 2 is an illustrative view illustrating one example of an operation of a bidirectional conversion circuit.

FIG. 9 is an illustrative view illustrating one example of an operation of the bidirectional conversion circuit according to the second embodiment.

FIG. 10 is an illustrative view illustrating one example of an operating state of the bidirectional conversion circuit according to the second embodiment.

FIG. 12 is an illustrative view illustrating one example of an operating state of the power conversion apparatus according to the second embodiment.

DETAILED DESCRIPTION

Figure 1:
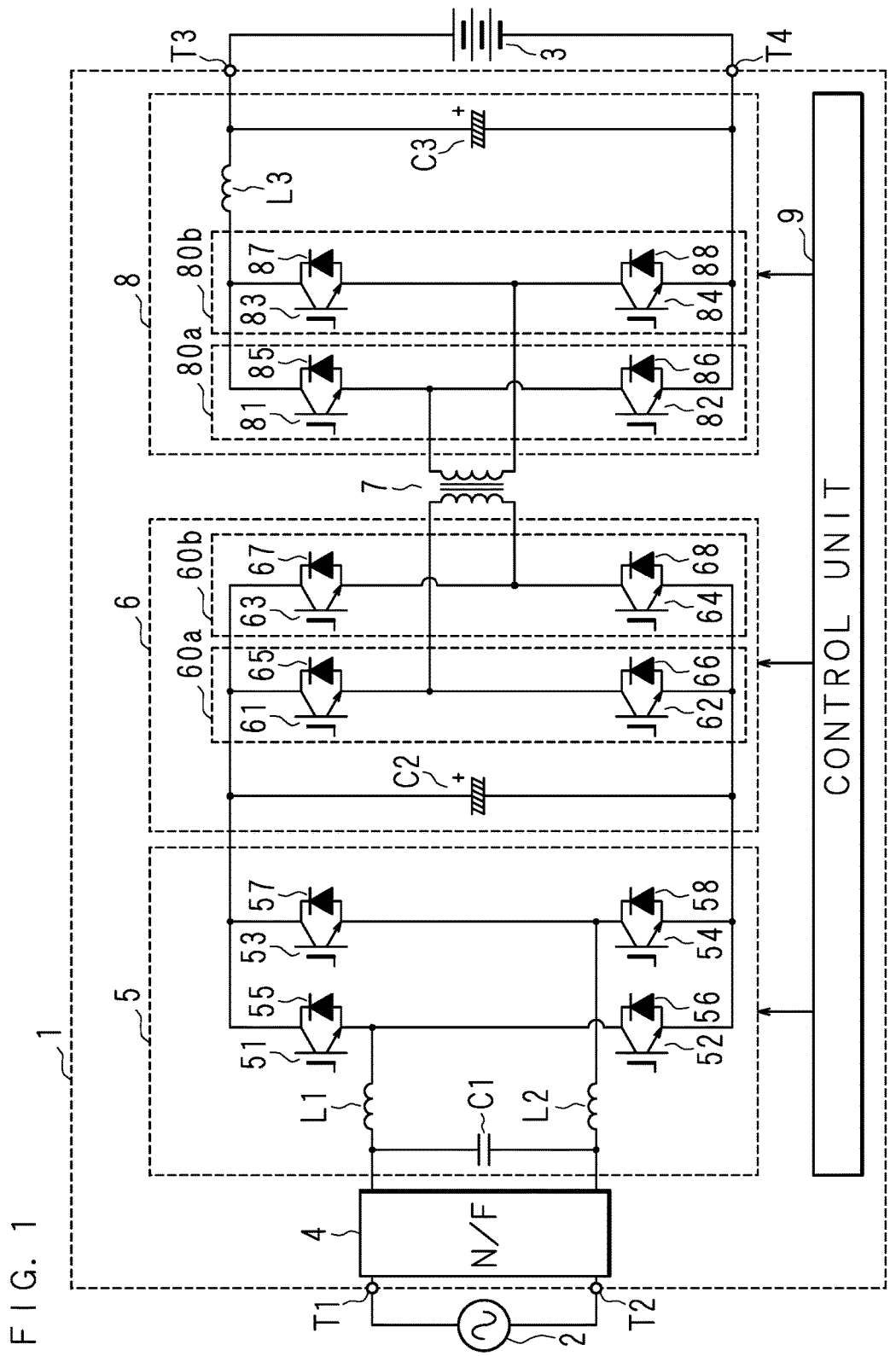
FIG. 1 is an illustrative view illustrating one example of a circuit configuration of a power conversion apparatus according to a first embodiment.

In the DC/DC converter in Japanese Patent Application Laid-Open Publication No. 2012-196089, however, if the switching elements constituting the single-phase bridges are turned on or off in a predetermined order, sharp current flows into the transformer.

This causes excessive surge voltage corresponding to the time variations of the current to occur at the leakage inductance of the transformer, and the occurring surge voltage is applied to the switching element in an off state, which may cause damage to the switching element.

The present disclosure is made to address these problems and aims at providing a power conversion apparatus capable of reducing the occurrence of the surge voltage and a control method for the power conversion apparatus.

According to the present disclosure, it is possible to reduce the occurrence of surge voltage.

The power conversion apparatus according to an embodiment of the present disclosure comprises: a plurality of series circuits each having a first switching element and a second switching element connected in series, the series circuits being connected in parallel, one end of each of the series circuits being connected to an inductor, each of junctions of the first switching element and the second switching element being connected to one side of a transformer; and a control unit that executes control so as to turn on or off the first switching element and the second switching element at a predetermined frequency. The control unit executes control to obtain a first control state in which the first switching element and the second switching element of one series circuit are on, to shift from the first control state to a second control state in which the first switching element of another series circuit and the second switching element of the one series circuit are on, and to apply predetermined voltage to the other side of the transformer over a predetermined time period during the first control state before shifting to the second control state.

The control method for the power conversion apparatus according to an embodiment of the present disclosure provided with a plurality of series circuits each having a first switching element and a second switching element connected in series, the series circuits being connected in parallel, one end of each of the series circuits being connected to an inductor, each of junctions of the first switching element and the second switching element being connected to one side of a transformer, and the first switching element and the second switching element being turned on or off at a predetermined frequency, comprises: a first control step of turning on the first switching element and the second switching element of one series circuit by a control unit; a second control step of shifting from the first control step and turning on the first switching element of another series circuit and the second switching element of the one series circuit by the control unit, and a controlling step of executing control by the control unit to apply predetermined voltage to the other side of the transformer over a predetermined time period during the first control step before shifting to the second control step.

The power conversion apparatus comprises the plurality of series circuits each having the first switching element and the second switching element connected in series, the series circuits being connected in parallel, one end of each of the series circuits being connected to the inductor, each of the junctions of the first switching element and the second switching element being connected to the one side of the transformer, and the control unit that executes control so as to turn on or off the first switching element and the second switching element at the predetermined frequency. In other words, a bridge circuit is formed by the first switching elements and the second switching elements constituting series circuits.

The control unit executes control to obtain the first control state in which the first switching element and the second switching element of one series circuit are on, to shift from the first control state to the second control state in which the first switching element of another series circuit and the second switching element of the one series circuit are on. In the first control state, the first switching element and the second switching element of the one series circuit are turned on to cause current to flow in the inductor and to cause the electrical energy to be stored in the inductor. In the second control state, the first switching element of the above-described series circuit and the second switching element of the one series circuit are turned on to cause sharp current based on the energy stored in the inductor to flow into the transformer. Here, the surge voltage based on the leakage inductance of the transformer and the time variations of the current may be applied to the second switching element of the above-described another series circuit and the first switching element of the one series circuit both of which are off state.

Here, the control unit controls application of the predetermined voltage to the other side of the transformer over the predetermined period during the first control state before shifting to the second control state. By applying the predetermined voltage to the other side of the transformer over the predetermined time period before the start of the second control state during which sharp current flows into the transformer, current is allowed to previously flow into the transformer. This enables gradual changes of the current that flows into the transformer at a time of a shift to the second control state and reduction in the occurrence of the surge voltage.

The power conversion apparatus according to an embodiment of the present disclosure provided with a control unit that executes control to turn on or off a first switching element and a second switching element at a predetermined frequency, comprises: an inductor connected to one end of the first switching element and one end of the second switching element; and a transformer with a winding having one end of the winding on the one side of the transformer connected to the other end of the first switching element, having the other end of the winding on the one side of the transformer connected to the other end of the second switching element and having a junction in a middle of the winding on the one side of the transformer, and the control unit executes control to obtain a first control state in which the first switching element and the second switching element are on, to shift from the first control state to a second control state in which either one of the first switching element or the second switching element is on, and to apply predetermined voltage to the other side of the transformer over a predetermined time period during the first control state before shifting to the second control state.

The control method for the power conversion apparatus according to an embodiment of the present disclosure provided with a control unit that executes control to turn on or off a first switching element and a second switching element at a predetermined frequency, an inductor connected to one end of the first switching element and one end of the second switching element, and a transformer with a winding having one end of the winding on the one side of the transformer connected to the other end of the first switching element, having the other end of the winding on the one side of the transformer connected to the other end of the second switching element and having a junction in a middle of the winding on the one side, comprises: a first control step of turning on the first switching element and the second switching element by the control unit; a second control step of shifting from the first control step and turning on either one of the first switching element or the second switching element by the control unit, and a controlling step of executing control by the control unit to apply predetermined voltage to the other side of the transformer over a predetermined time period during the first control step before shifting to the second control step.

The power conversion apparatus is provided with the control unit that executes control to turn on or off the first switching element and the second switching element at the predetermined frequency, the inductor connected to one end of the first switching element and one end of the second switching element, and the transformer with the winding having the one end of the winding on the one side of the transformer connected to the other end of the first switching element, having the other end of the winding on the one side of the transformer connected to the other end of the second switching element and having the junction in the middle of the winding on the one side of the transformer. In other words, the one side of the transformer is a center-tapped typed transformer with the winding having both ends of the winding to which the first switching element and the second switching element are connected.

The control unit executes control to obtain the first control state in which the first switching element and the second switching element are on, and to shift from the first control state to the second control state in which either one of the first switching element or the second switching element is on. In the first control state, the first switching element and the second switching element are turned on to cause current to flow in the inductor and to cause the electrical energy to be stored in the inductor. In the second control state, either one of the first switching element or the second switching element is turned on, that is, either one of the first switching element or the second switching element is turned off to thereby cause sharp current based on the energy stored in the inductor to flow into the transformer. Here, by the current flowing into the transformer, excessive surge voltage occurring between the one end of the winding of the transformer to which the switching element in an on state (for example, the first switching element) and the junction (center tap) may be applied to the switching element in an off state (for example, the second switching element) connected to the other end of the winding of the transformer.

Here, the control unit executes control to apply the predetermined voltage to the other side of the transformer over the predetermined time period during the first control state before shifting to the second control state. By applying the predetermined voltage to the other side of the transformer over the predetermined time period before the start of the second control state during which sharp current flows into the transformer, current is allowed to previously flow into the transformer. This enables gradual changes of the current that flows into the transformer at a time of a shift to the second control state and reduction in the occurrence of the surge voltage.

In the power conversion apparatus according to an embodiment of the present disclosure, the control unit executes control to apply the predetermined voltage such that current flows in the same direction as current flowing into the transformer in the second control state.

The control unit executes the control to apply the predetermined voltage such that the current flows in the same direction as the current flowing into the transformer in the second control state. By previously flowing, over the predetermined time period before the start of the second control state, a required current in the same direction as the current flowing into the transformer at the start of the second control state, the apparent peak value of the current flowing into the transformer at the start of the second control state can be made small. This makes it possible to reduce the occurrence of the surge voltage at the start of the second control state.

The power conversion apparatus according to an embodiment of the present disclosure further comprises a plurality of series circuits each having a third switching element and a fourth switching element connected in series, the series circuits being connected in parallel, each of junctions of the third switching element and the fourth switching element is connected to the other side of the transformer, and the control unit executes control to apply the predetermined voltage by turning on the third switching element of one series circuit and the fourth switching element of another series circuit.

The plurality of series circuits are provided, each having the third switching element and the fourth switching element connected in series, the series circuits are connected in parallel, and each of the junctions of the third switching element and the fourth switching element is connected to the other side of the transformer. The control unit executes control to apply the predetermined voltage by turning on the third switching element of the one series circuit and the fourth switching element of the above-described series circuit. By turning on the third switching element of the one series circuit and the fourth switching element of the above-described series circuit, the predetermined voltage is allowed to be applied to the other side of the transformer, and current flows in the same direction as the current flowing into the transformer during the second control state is allowed to flow. This prevents the surge voltage that is to be applied to the switching element in an off state at the start of the second control state from occurring.

In the power conversion apparatus according to an embodiment of the present disclosure, at least one of the junctions of the third switching element and the fourth switching element is connected to the other side of the transformer through an inductor, and a capacitor is connected to both ends of the third switching element and the fourth switching element.

By turning on the third switching element of the one series circuit and the fourth switching element of the above-described series circuit, the predetermined voltage is allowed to be applied to the other side of the transformer, and current in the same direction as the current flowing into the transformer during the second control state is allowed to flow. This prevents the surge voltage that is to be applied to the switching elements in an off state at the start of the second control state from occurring.

The power conversion apparatus according to an embodiment of the present disclosure further comprises a series circuit having a third switching element and a fourth switching element connected in series, and a junction of the third switching element and the fourth switching element is connected to one end of a winding on the other side of the transformer, and the control unit executes control to apply the predetermined voltage by turning on either one of the third switching element or the fourth switching element.

The series circuit having the third switching element and the fourth switching element connected in series is provided. The junction of the third switching element and the fourth switching element is connected to the one end of the winding on the other side of the transformer. That is, the other side of the transformer forms a half-bridge circuit. The control unit executes the control to apply the predetermined voltage by turning on either one of the third switching element or the fourth switching element.

By turning on either one of the third switching element or the fourth switching element, the predetermined voltage allows to be applied to the other side of the transformer, and current is allowed to flow in the same direction as the current flowing into the transformer during the second control state. This prevents the surge voltage that is to be applied to the switching elements in an off state at the start of the second control state from occurring.

First Embodiment

The following describes the present disclosure with reference to the drawings illustrating embodiments. FIG. 1 is an illustrative view illustrating one example of a circuit configuration of a power conversion apparatus 1 according to a first embodiment. The power conversion apparatus 1 according to the present embodiment is an isolated conversion apparatus that is mounted on, for example, a plug-in hybrid electric vehicle or an electric vehicle, and performs bidirectional AC-DC conversion between AC voltage and DC voltage. The power conversion apparatus 1 includes a noise filter 4, a bidirectional conversion circuit 5 having a PFC function, a bidirectional DC/DC converter (for example, isolated DC/DC converter) 6, a transformer 7, a bidirectional conversion circuit 8, and a control unit 9 that controls turning on or off of the switching elements described later constituting each conversion circuit.

The bidirectional conversion circuit 5 includes a circuit having two series circuits connected in parallel. One series circuit has transistors 51 and 52 connected in series, and the other series circuit has transistors 53 and 54 connected in series. The transistors 51, 52, 53 and 54 may use an insulated gate bipolar transistor (hereinafter, referred to as IGBT) although not limited to the IGBT, and may use a metal oxide semiconductor field effect transistor (hereinafter referred to as MOSFET) in place of the IGBT. Furthermore, diodes 55, 56, 57 and 58 are connected in antiparallel (the collector is connected to the cathode and the emitter is connected to the anode) between the collectors and the emitters of the transistors 51, 52, 53 and 54, respectively.

A junction of the emitter of the transistor 51 and the collector of the transistor 52 is connected to one end of a coil L1 while a junction of the emitter of the transistor 53 and the collector of the transistor 54 is connected to one end of a coil L2. The other ends of the coils L1 and L2 are connected to AC input terminals T1 and T2 through the noise filter 4, respectively. Across the coils L1 and L2, a capacitor C1 is connected. The coils L1 and L2 and the capacitor C1 constitute a filter. The AC input terminals T1 and T2 are connected to an AC power supply 2.

The bidirectional conversion circuit 8 has a first series circuit 80a and a second series circuit 80b connected in parallel. The first series circuit 80a has a transistor 81 functioning as a first switching element and a transistor 82 functioning as a second switching element that are connected in series while the second series circuit 80b has a transistor 83 functioning as a first switching element and a transistor 84 functioning as a second switching element that are connected in series. More specifically, the emitter of the transistor 81 and the collector of the transistor 82 are connected, and the emitter of the transistor 83 and the collector of the transistor 84 are connected. Furthermore, the collectors of the transistors 81 and 83 are connected to each other while the emitters of the transistors 82 and 84 are connected to each other. The emitters of the transistors 82 and 84 are connected to a DC output terminal T4. In other words, the first series circuit 80a and the second series circuit 80b constitute a bridge circuit.

An inductor L3 is connected, at one end, to one end of the first series circuit 80a and the second series circuit 80b, i.e., the collectors of the transistors 81 and 83 and connected, at the other end, to a DC output terminal T3. Across the DC output terminals T3 and T4, a capacitor C3 is connected. Across the DC output terminals T3 and T4, a battery 3 is connected.

A junction of the emitter of the transistor 81 and the collector of the transistor 82 and a junction of the emitter of the transistor 83 and the collector of the transistor 84 are connected to one side of the transformer 7. Furthermore, diodes 85, 86, 87 and 88 are connected in antiparallel between the collectors and the emitters of the transistors 81, 82, 83 and 84, respectively.

The control unit 9 controls turning on or off of each of the transistors 81, 82, 83 and 84 at a predetermined frequency (for example, 50 kHz although the frequency is not limited thereto). The transistors 81, 82, 83 and 84 may use an IGBT although not limited to the IGBT, and may use a MOSFET in place of the IGBT.

The bidirectional conversion circuit 6 has a first series circuit 60a and a second series circuit 60b connected in parallel. The first series circuit 60a has a transistor 61 functioning as a third switching element and a transistor 62 functioning as a fourth switching element that are connected in series while the second series circuit 60b has a transistor 63 functioning as a third switching element and a transistor 64 functioning as a fourth switching element that are connected in series. More specifically, the emitter of the transistor 61 and the collector of the transistor 62 are connected, and the emitter of the transistor 63 and the collector of the transistor 64 are connected. Furthermore, the collectors of the transistors 61 and 63 are connected to each other while the emitters of the transistors 62 and 64 are connected to each other. The emitters of the transistors 62 and 64 are connected to the emitters of the transistors 52 and 54 of the bidirectional conversion circuit 5 while the collectors of the transistors 61 and 63 are connected to the collectors of the transistors 51 and 53 of the bidirectional conversion circuit 5. In other words, the first series circuit 60a and the second series circuit 60b constitute a bridge circuit.

A junction of the emitter of the transistor 61 and the collector of the transistor 62 and a junction of the emitter of the transistor 63 and the collector of the transistor 64 are connected to the other side of the transformer 7. Furthermore, diodes 65, 66, 67 and 68 are connected in antiparallel between the collectors and the emitters of the transistors 61, 62, 63 and 64, respectively.

The bidirectional conversion circuit 6 is connected with a capacitor C2 on the side nearer to the bidirectional conversion circuit 5. In other words, the capacitor C2 is connected between the collector of the transistor 61 and the emitter of the transistor 62.

The control unit 9 controls turning on or off of each of the transistors 61, 62, 63 and 64 at a predetermined frequency (for example, 50 kHz although the frequency is not limited thereto). The transistors 61, 62, 63 and 64 may use an IGBT although not limited to the IGBT, and may use a MOSFET in place of the IGBT.

Upon charging, the AC supplied from the AC power supply 2 and applied across the AC input terminals T1 and T2 is improved in the power factor and converted to DC by the bidirectional conversion circuit 5. The converted DC is temporarily converted to AC by the bidirectional conversion circuit 6, and the converted AC is further rectified by the bidirectional conversion circuit 8 and then charged in the battery 3.

Upon discharging, the DC supplied from the battery 3 is temporarily converted to AC by the bidirectional conversion circuit 8, and the converted AC is further rectified to DC by the bidirectional conversion circuit 6. The converted DC is converted to AC by the bidirectional conversion circuit 5, and the AC is output.

The following describes an operation of the bidirectional conversion circuit 8. FIG. 2 is an illustrative view illustrating one example of an operation of the bidirectional conversion circuit 8. FIG. 2 schematically illustrates a manner in which the DC from the battery 3 is converted to AC. The following description is made with reference to FIG. 2. The description is made regarding the time period from a state A to a state D in FIG. 2, that is, a cycle T during which the transistors 81, 82, 83 and 84 are turned on or off as 20 μs although the time period is not limited thereto.

As illustrated in the state A, the control unit 9 turns off the transistors 81 and 82 and turns on the transistors 83 and 84. The time period during the state A can be several μs, for example. In the state A, the DC from the battery 3 flows into the transistors 83 and 84 to cause the electrical energy to be stored in the inductor L3.

Then, as illustrated in the state B, the control unit 9 turns off the transistors 83 and 82 and turns on the transistors 81 and 84. The time period during the state B can be on the order of (10 μs-several μs), for example. In the state B, current flows into the transformer 7 in the illustrated direction. Here, the electrical energy stored in the inductor L3 is released to thereby boost the voltage that is output from the transformer.

After the lapse of the half cycle T/2 from the start of the state A, the control unit 9 turns on the transistors 81 and 82 and turns off the transistors 83 and 84 as illustrated in the state C. The time period during the state C can be several μs, for example. In the state C, the DC from the battery 3 flows into the transistors 81 and 82, to cause the electrical energy to be stored in the inductor L3.

Then, as illustrated in the state D, the control unit 9 turns off the transistors 81 and 84 and turns on the transistors 82 and 83. The time period during the state D can be on the order of (10 μs-several μs), for example. In the state D, current flows into the transformer 7 in the illustrated direction (direction opposite to that in the state B). Here, the electrical energy stored in the inductor L3 is released to thereby boost the voltage that is output from the transformer.

Figure 3:
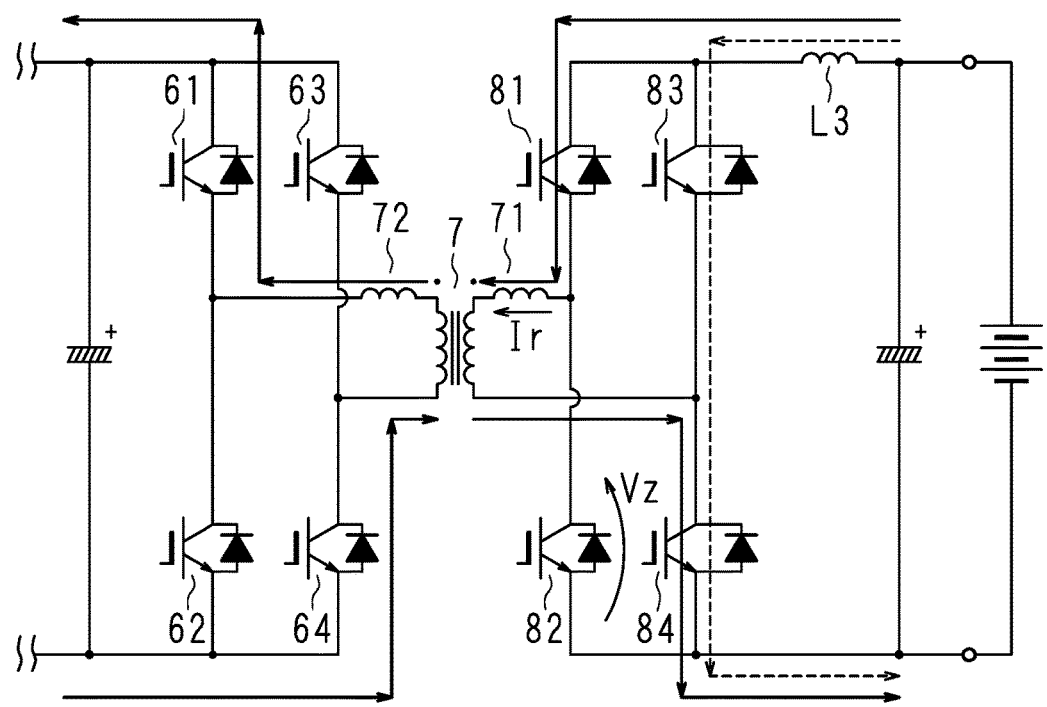
FIG. 3 is an illustrative view illustrating one example of an operating state of the bidirectional conversion circuit.
Figure 4:
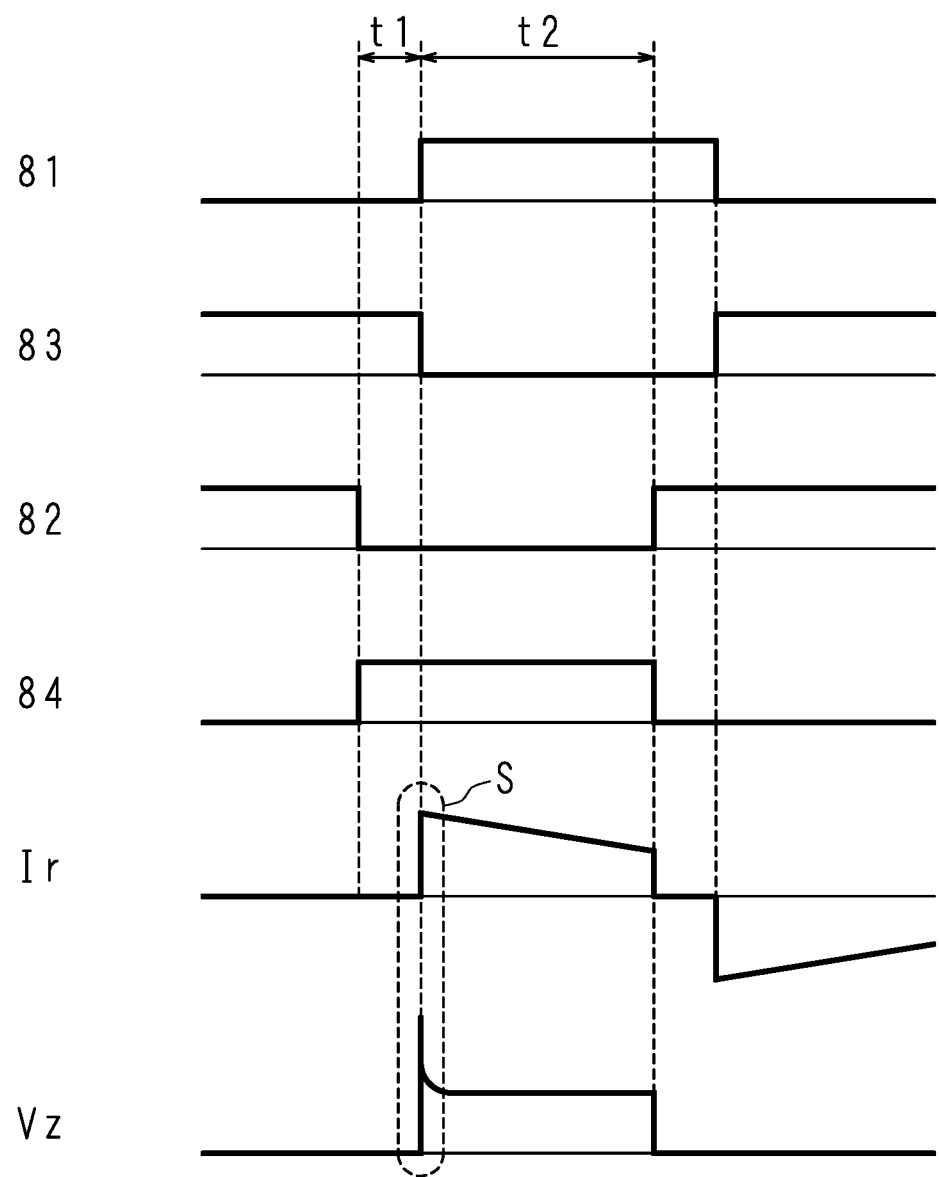
FIG. 4 is a timing diagram illustrating one example of the surge voltage occurring in the transistors of the bidirectional conversion circuit.

The following describes the surge voltage occurring when the bidirectional conversion circuit 8 operates. FIG. 3 is an illustrative view illustrating one example of an operating state of the bidirectional conversion circuit 8, and FIG. 4 is a timing diagram illustrating one example of the surge voltage occurring in the transistor in the bidirectional conversion circuit 8. The current indicated by the dashed line in FIG. 3 depicts a current flow during the state A in FIG. 2, and the current indicated by the solid line in FIG. 3 depicts current flowing during the state B in FIG. 2. The timing charts illustrated at the upper part of FIG. 4 show the base voltages applied to the bases of the transistors 81, 82, 83 and 84, and the transistors are on in the presence of the base voltages.

The time period denoted by the reference code t1 in FIG. 4 is a time period during which the current indicated by the dashed line in FIG. 3 flows, and the transistors 83 and 84 are on. The time period denoted by the reference code t2 in FIG. 4 is a time period during which the current indicated by the solid line in FIG. 3 flows, and the transistors 81 and 84 are on. The time period t1 is a first control state in which the first switching element and the second switching element of one series circuit (transistors 83 and 84 in the example in FIG. 3) are turned on. The time period t2 is a second control state, after shifting from the first control state, in which the first switching element of the other series circuit and the second switching element of the one series circuit (transistors 81 and 84 in the example in FIG. 3) are turned on.

As illustrated in FIG. 4, when the time period t1 shifts to the time period t2, that is, when the transistor 81 is turned from off to on while the transistor 84 is held on, sharp current flows into the transformer 7. When the leakage inductance in the transformer 7 is thus denoted by the reference numerals 71 and 72 as illustrated in FIG. 3, the voltage Vz in proportion to the time variations of the sharp current Ir (denoted by the reference code S in FIG. 4) flowing into the leakage inductance 71 occurs between the collector and the emitter of the transistor 82 in an off state as surge voltage (denoted by the reference code S in FIG. 4). It is noted that similar surge voltage occurs between the collector and the emitter of another transistor 83 in an off state. In order to withstand such the surge voltage, it is required to use a high-voltage transistor or separately provide a surge suppressing circuit or the like, which leads to an increase in cost.

Figure 5:
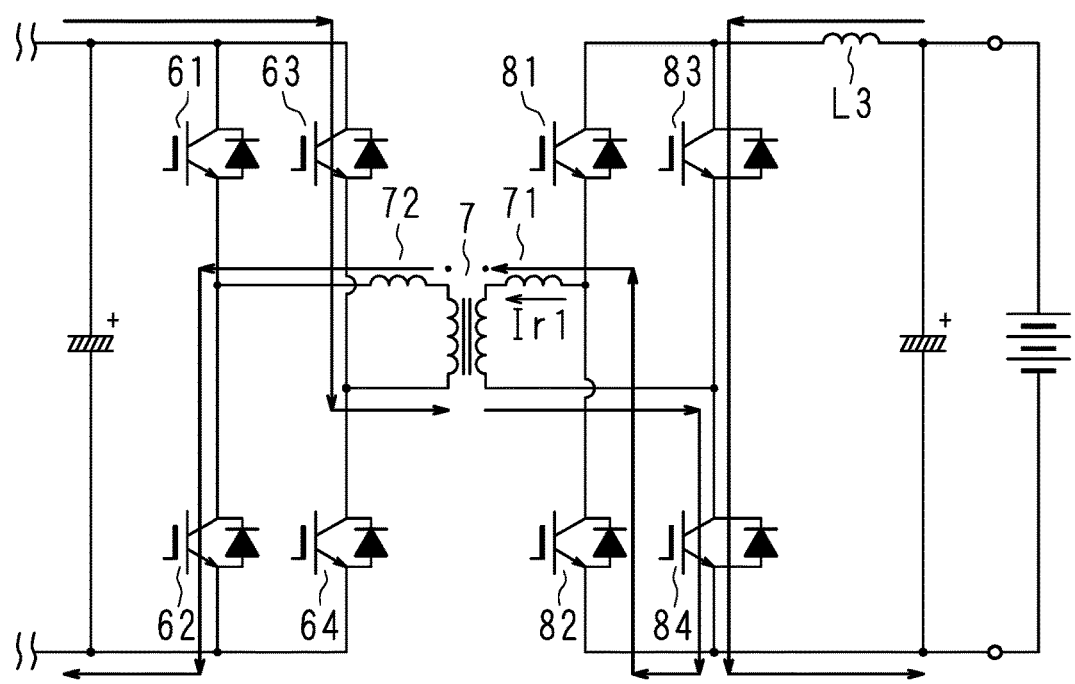
FIG. 5 is an illustrative view illustrating one example of an operating state of the power conversion apparatus according to the first embodiment.
Figure 6:
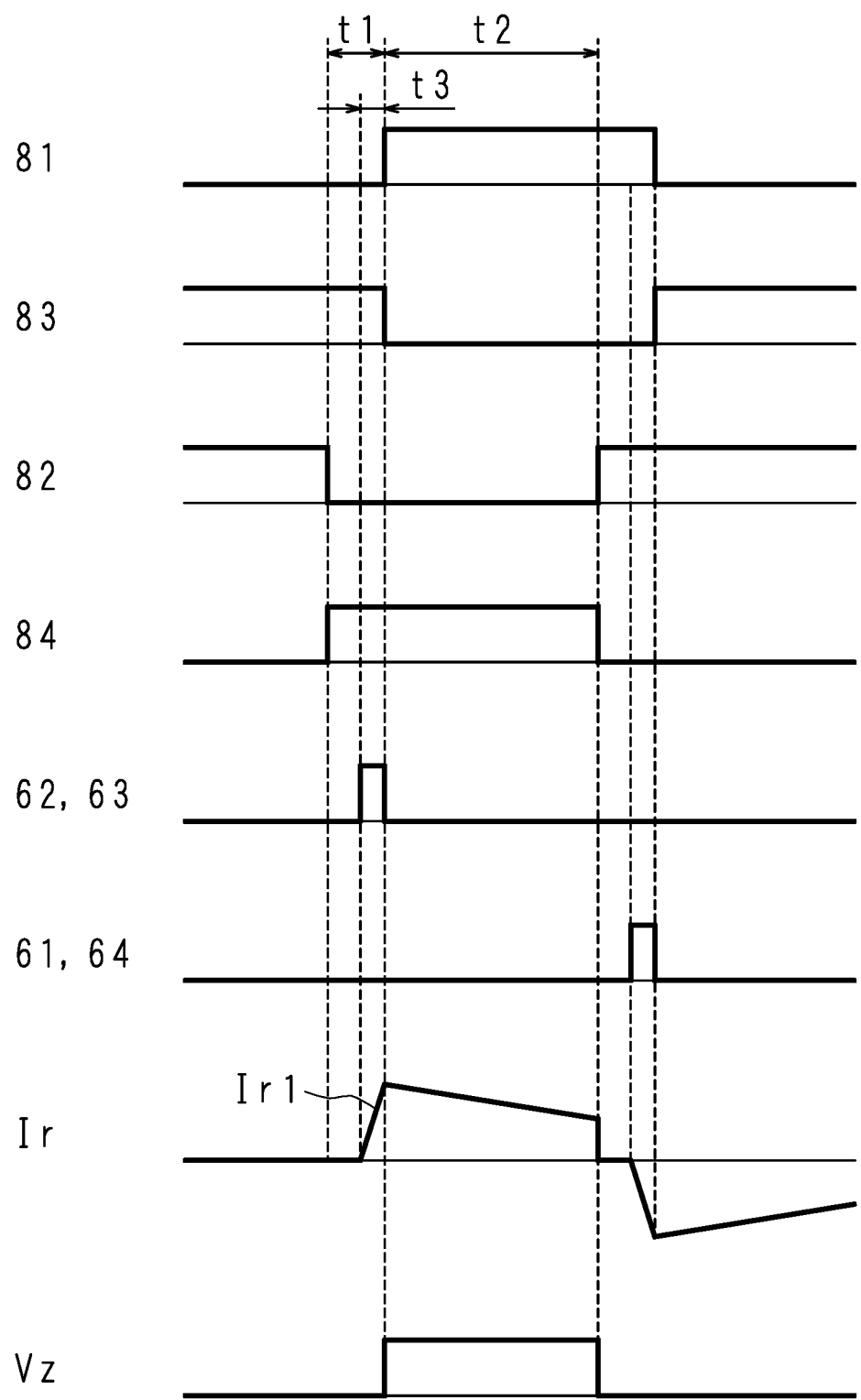
FIG. 6 is a timing diagram illustrating one example of voltage or current waveforms of the components of the power conversion apparatus according to the first embodiment.

Here, a control method for the power conversion apparatus according to the present embodiment is described below. FIG. 5 is an illustrative view illustrating one example of an operating state of the power conversion apparatus according to the first embodiment, and FIG. 6 is a timing diagram illustrating one example of voltage or current waveforms of the components of the power conversion apparatus according to the first embodiment. In FIG. 5, the reference numeral 71 denotes the leakage inductance of the transformer 7. Also, FIG. 6 schematically illustrates the base voltages of the transistors 81, 82, 83, 84, 61, 62, 63 and 64, the collector-emitter voltage Vz of the transistor 82 in an off state and the current Ir flowing into the leakage inductance 71.

The control unit 9 executes control so as to apply predetermined voltage to the other side of the transformer 7 as illustrated in FIG. 5 over a predetermined time period (time period t3 in FIG. 6) during the first control state (time period t1 in FIG. 6) before shifting to the second control state (time period t2 in FIG. 6).

By applying the predetermined voltage to the other side of the transformer 7 over the predetermined time period (time period t3) before the start of the time period t2 during which sharp current flows into the transformer 7, current is allowed to previously flow into the transformer 7. This enables gradual changes of the current that flows into the transformer 7 at a time of a shift to the state t2 in which the transistors 81 and 84 are on and enables reduction in the occurrence of the surge voltage.

More specifically, the control unit 9 executes control so as to apply the predetermined voltage such that current flows in the same direction as the current flows into the transformer 7 in the state t2 during which the transistors 81 and 84 are on. By previously flowing, over the predetermined time period t3 before the start of the time period t2, a required current (current denoted by the reference code Ir1 in FIG. 6) in the same direction as the current flowing into the transformer 7 at the start of the time period t2, the apparent peak value of the current flowing into the transformer 7 at the start of the time period t2 can be made small. This makes it possible to reduce the voltage occurring in the leakage inductance 71 and reduce the occurrence of the surge voltage at the start of the time period t2.

In order to apply the predetermined voltage to the transformer 7, the following method can be taken as one example. As illustrated in FIG. 5, the control unit 9 executes control to apply the predetermined voltage by turning on the third switching element of the one series circuit (transistor 63 in the example in FIG. 5) and turning on the fourth switching element of the other series circuit (transistor 62 in the example in FIG. 5). By turning on the third switching element of the one series circuit and the fourth switching element of the other series circuit, the predetermined voltage is allowed to be applied to the other side of the transformer 7, and current is allowed to flow in the same direction as the current flowing into the transformer 7 during the time period t2.

This prevents the surge voltages at the start of the time period t2 that is to be applied to the switching elements in an off state (transistors 82, 83 in the example in FIG. 5) from occurring, eliminates the need for using a high-voltage transistor or separately providing a surge suppressing circuit, which lead to a reduction in cost.

Figure 7:
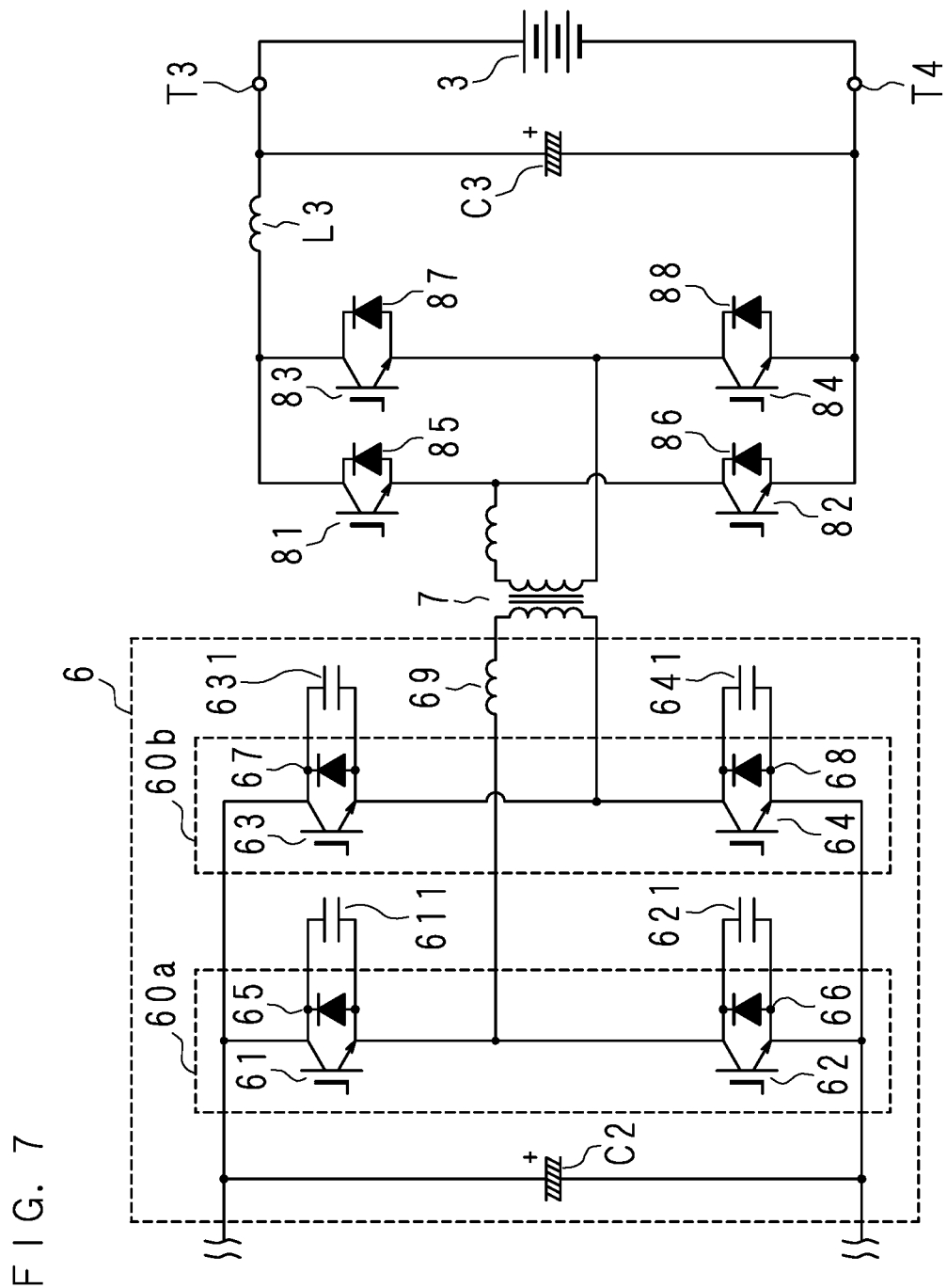
FIG. 7 is an illustrative view illustrating another example of the circuit configuration of the power conversion apparatus according to the first embodiment.

FIG. 7 is an illustrative view illustrating another example of a circuit configuration of the power conversion apparatus according to the first embodiment. The example in FIG. 7 is different from the bidirectional conversion circuit 6 illustrated in FIG. 1 in that a resonance capacitor and a resonance inductor are added.

In other words, as illustrated in FIG. 7, the bidirectional conversion circuit 6 has the first series circuit 60a and the second series circuit 60b connected in parallel. The first series circuit 60a has the transistor 61 functioning as a third switching element and the transistor 62 functioning as a fourth switching element that are connected in series, and the second series circuit 60b has the transistor 63 functioning as a third switching element and the transistor 64 functioning as a fourth switching element that are connected in series. More specifically, the emitter of the transistor 61 and the collector of the transistor 62 are connected, and the emitter of the transistor 63 and the collector of the transistor 64 are connected. Furthermore, the collectors of the transistors 61 and 63 are connected to each other while the emitters of the transistors 62 and 64 are connected to each other. In other words, the first series circuit 60a and the second series circuit 60b constitute a bridge circuit.

The junction of the emitter of the transistor 61 and the collector of the transistor 62 is connected to the other side of the transformer 7 through a resonance inductor 69. The junction of the emitter of the transistor 63 and the collector of the transistor 64 is connected to the other side of the transformer 7. Furthermore, the diodes 65, 66, 67 and 68 are connected in antiparallel between the collectors and the emitters of the transistors 61, 62, 63 and 64, respectively. In addition, resonance capacitors 611, 621, 631 and 641 are connected between the collectors and the emitters of the transistors 61, 62, 63 and 64, respectively. It is noted that in the example in FIG. 7, the one end of the inductor 69 is connected to the junction of the emitter of the transistor 61 and the collector of the transistor 62, but the one end of the inductor 69 may alternatively be connected to the junction of the emitter of the transistor 63 and the collector of the transistor 64. Further alternatively, two inductors may be employed to allow the junction of the emitter of the transistor 61 and the collector of the transistor 62 and the junction of the emitter of the transistor 63 and the collector of the transistor 64 to be connected to respective ends of the inductors.

In the case that the bidirectional conversion circuit 6 is operated in a charge mode, by performing phase-shift control with the resonance capacitors 611, 621, 631 and 641 and the resonance inductor 69, the overlap of the voltage and the current at a time of switching the transistors 61, 62, 63 and 64 is reduced to thereby enable reduction in switching loses.

Here, in the case that the bidirectional conversion circuit 6 is operated in a discharge mode, the operation of the circuit illustrated in FIG. 7 is similar to those in the examples in FIG. 5 and FIG. 6, and thus, the description thereof is omitted.

The above-described embodiment is configured such that the control unit 9 turns off the transistors 81 and 82 and turns on the transistors 83 and 84 as illustrated in the state A in FIG. 2, and the control unit 9 turns on the transistors 81 and 82 and turns off the transistors 83 and 84 as illustrated in the state C in FIG. 2 although the configuration is not limited thereto. For example, in the state A in FIG. 2 and the state C in FIG. 2, all the transistors 81, 82, 83 and 84 may be turned on. In other words, in the first control state indicated by the time period t1, in addition to turning on the first switching element and the second switching element of the one series circuit (transistors 83, 84 in the examples in FIG. 3 and FIG. 5), the first switching element and the second switching element of the other series circuit (transistors 81, 82 in the examples in FIG. 3 and FIG. 5) may be turned on. By turning on all the transistors 81, 82, 83 and 84, current is diverted to thereby enable reduction in conduction loses of the transistors 81, 82, 83 and 84.

Second Embodiment

Figure 8:
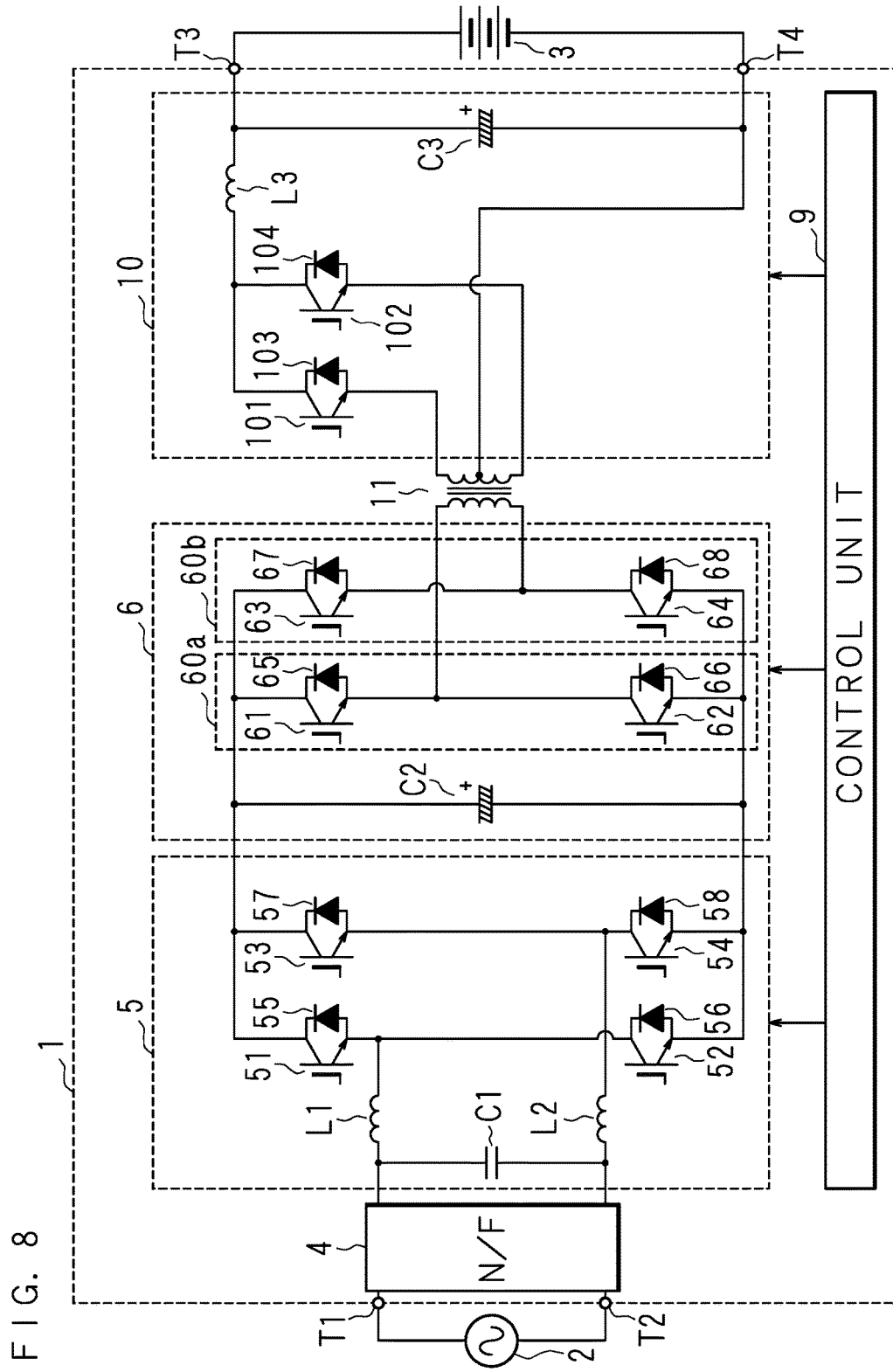
FIG. 8 is an illustrative view illustrating one example of a circuit configuration of a power conversion apparatus according to a second embodiment.

FIG. 8 is an illustrative view illustrating one example of a circuit configuration of a power conversion apparatus 1 according to a second embodiment. In the second embodiment, a transformer 11 (potential transformer) is provided in place of the transformer 7, and a bidirectional conversion circuit 10 is provided in place of the bidirectional conversion circuit 8. It is noted that the same reference numeral are given to components similar to those of the first embodiment, and the description thereof is omitted.

The bidirectional conversion circuit 10 has a transistor 101 functioning as a first switching element and a transistor 102 functioning as a second switching element, an inductor L3 connected to one end of the transistor 101 and one end of the transistor 102, and the transformer 11 provided with a winding having one end of the winding on the one side of the transformer connected to the other end of the transistor 101, having the other end of the winding on the one side of the transformer connected to the other end of the transistor 102, and having a junction in the middle of the winding on the one side. The transformer 11 is a so-called center-tapped system in which a junction is provided in the middle of the winding on the one side of the transformer.

More specifically, the collectors of the transistors 101 and 102 are connected to each other and further connected to the one end of the inductor L3. The other end of the inductor L3 is connected to the DC output terminal T3. The emitter of the transistor 101 is connected to the one end of the winding on the one side of the transformer 11. The emitter of the transistor 102 is connected to the other end of the winding on the one side of the transformer 11. The center tap (junction in the middle) of the winding on the one side of the transformer 11 is connected to the DC output terminal T4. Furthermore, diodes 103 and 104 are connected in antiparallel between the collectors and the emitters of the transistors 101 and 102, respectively.

The control unit 9 controls turning on or off of the transistors 101 and 102 at a predetermined frequency (for example, 50 kHz although the frequency is not limited thereto). The transistors 101 and 102 may use an IGBT although not limited to the IGBT and may use a MOSFET in place of the IGBT.

The following describes an operation of the bidirectional conversion circuit 10. FIG. 9 is an illustrative view illustrating one example of an operation of the bidirectional conversion circuit 10 according to the second embodiment. FIG. 9 schematically illustrates a manner in which the DC from the battery 3 is converted to AC. The following description is made with reference to FIG. 9.

As illustrated in a state A in FIG. 9, the control unit 9 turns on the transistors 101 and 102. The time period during the state A can be several μs, for example. In the state A, the DC from the battery 3 flows into the transistors 101 and 102 to cause the electrical energy to be stored in the inductor L3.

Then, as illustrated in a state B, the control unit 9 turns off the transistor 102 while the transistor 101 is held on. The time period during the state B can be on the order of (10 μs-several μs), for example, although the time period is not limited thereto. In the state B, current flows into the transformer 11 in the illustrated direction. In this case, the electrical energy stored in the inductor L3 is released to thereby boost the voltage that is output from the transformer 11.

After the lapse of the half cycle T/2 from the start of the state A, the control unit 9 turns on the transistors 102 while the transistor 101 is held on as illustrated in a state C. The time period during the state C can be several μs, for example. In the state C, the DC from the battery 3 flows into the transistors 101 and 102 to cause the electrical energy to be stored in the inductor L3.

Then, as illustrated in a state D, the control unit 9 turns off the transistor 101 while the transistor 102 is held on. The time period during the state D can be on the order of (10-several μs), for example. In the state D, current flows into the transformer 11 in the illustrated direction (direction opposite to that in the state B). In this case also, the electrical energy stored in the inductor L3 is released to thereby boost the voltage that is output from the transformer 11.

Figure 11:
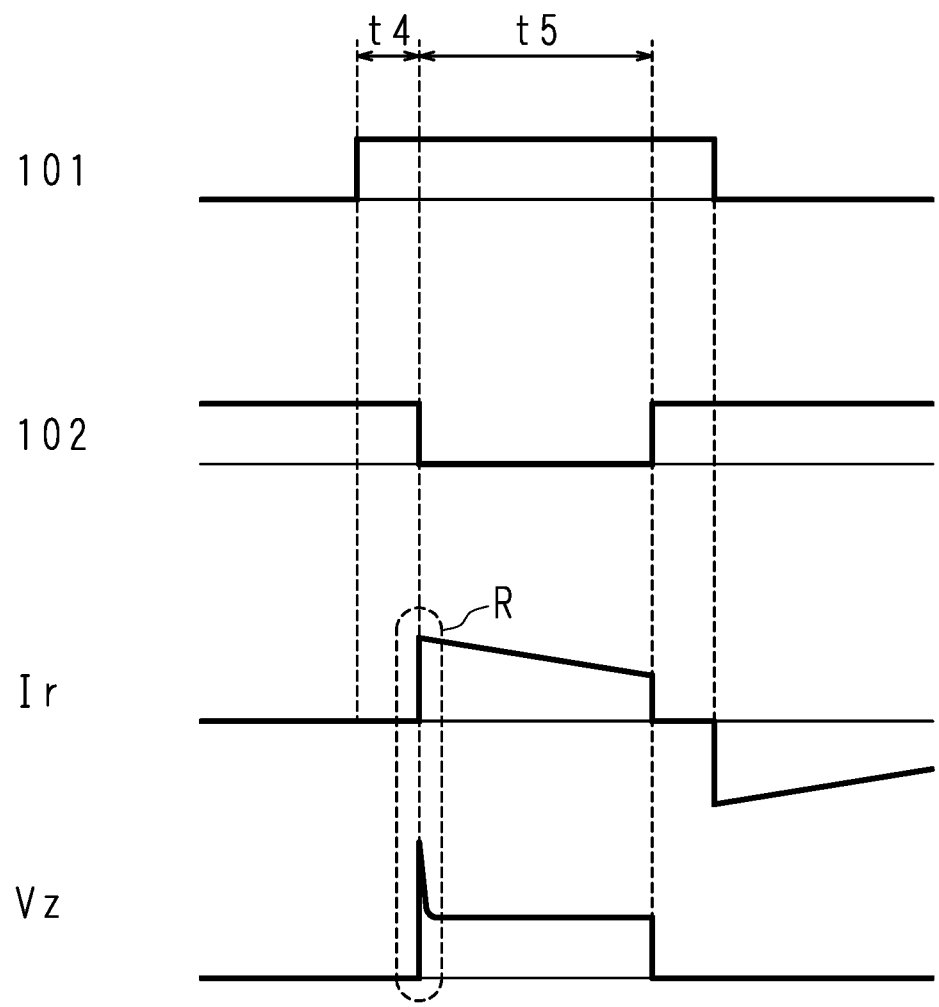
FIG. 11 is a timing diagram illustrating one example of surge voltage occurring in the bidirectional conversion circuit according to the second embodiment.

The following describes surge voltage occurring when the bidirectional conversion circuit 10 operates. FIG. 10 is an illustrative view illustrating one example of an operating state of the bidirectional conversion circuit 10 according to the second embodiment, and FIG. 11 is a timing diagram illustrating one example of surge voltage occurring in the transistor of the bidirectional conversion circuit 10 according to the second embodiment. The current indicated by the solid line in FIG. 10 depicts the current flow in the state B in FIG. 9. Also, the timing diagram in FIG. 11 illustrates, from the top, the base voltage applied to the base of the transistor 101, the base voltage applied to the base of the transistor 102, the current flowing into the transformer 11 and the collector-emitter voltage of the transistor 102. The horizontal axis in the timing diagram in FIG. 11 indicates time.

The time period denoted by the reference code t4 in FIG. 11 is a time period during which the transistors 101 and 102 are on. The time period denoted by a reference code t5 in FIG. 11 is a time period during which the current indicated by the solid line in FIG. 10 flows, and the transistor 101 is on and the transistor 102 is off. The time period t4 is a first control state in which the first switching element and the second switching element (transistors 101 and 102 in the example in FIG. 10) are turned on, and the time period t5 is a second control state to which the first control state shifts and in which either one of the first switching element or the second switching element (transistors 101 in the example in FIG. 10) is turned on.

As illustrated in FIG. 11, when the time period t4 shifts to the time period t5, that is, when the transistor 102 is turned from on to off while the transistor 101 is held on, sharp current based on the energy stored in the inductor L3 flows into the transformer 11. When the leakage inductance in the transformer 11 is denoted by reference numerals 111 and 112 as illustrated in FIG. 10, the voltage Vz occurs in proportion to the time variations of the sharp current Ir (denoted by a reference code R in FIG. 11) that flows into the leakage inductance 111. That is, by the sharp current Ir flowing into the transformer 11, excessive surge voltage Vz occurs between the one end of the winding of the transformer 11 to which the emitter of the transistor 101 in an on state is connected and the junction (center tap).

Since the junction (center tap) of the transformer 11 and the emitter of the transistor 102 in an off state conduct, and the transistor 101 is in an on state, the collector of the transistor 101 (i.e., the collector of the transistor 102) and the emitter of the transistor 101 (i.e., the one end of the winding of the transformer 11) are approximately at the same potential. Thus, the above-described surge voltage Vz may occur between the collector and emitter of the transistor 102 in an off state that is connected to the other end of the winding of the transformer 11.

In order to withstand such the surge voltage, it is required to use a high-voltage transistor or separately provide a surge suppressing circuit or the like, resulting in an increase in cost.

Figure 13:
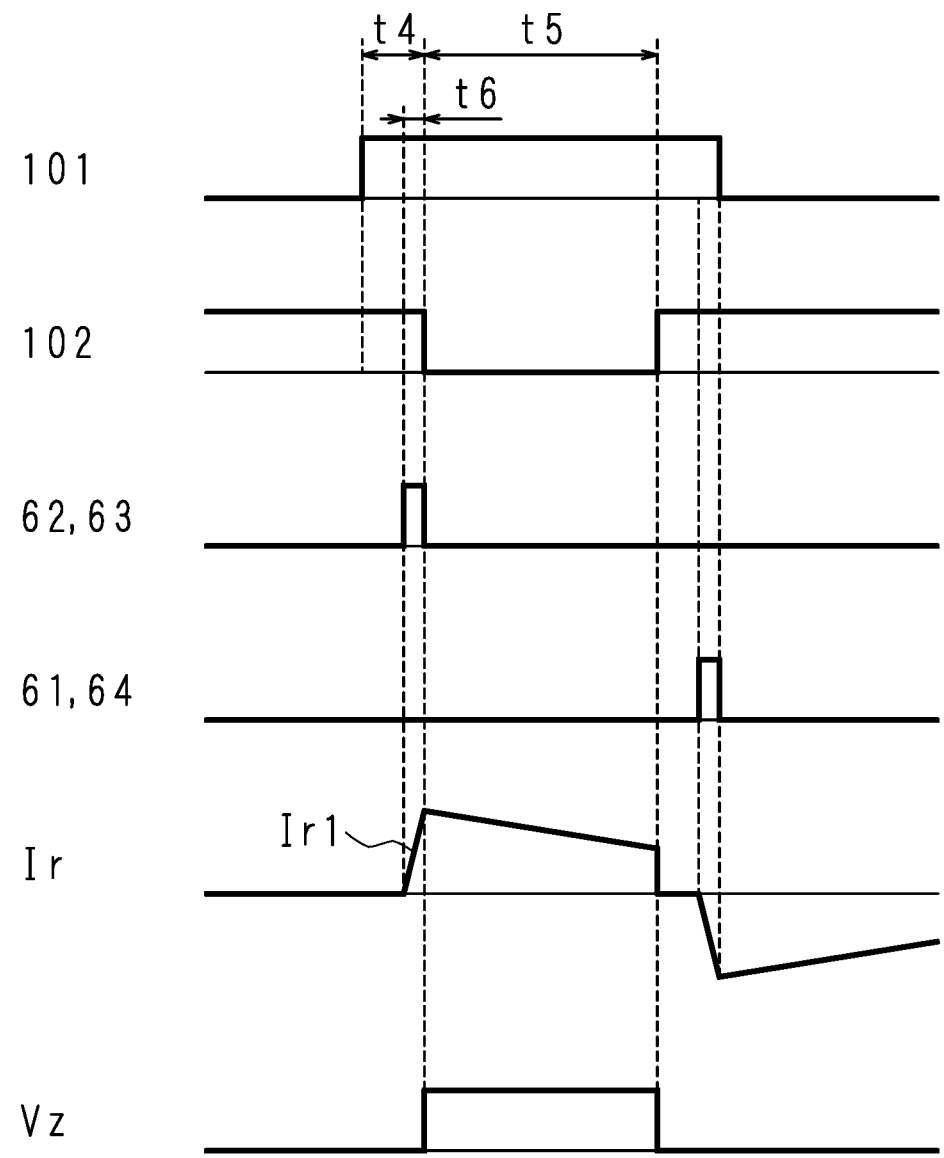
FIG. 13 is a timing diagram illustrating one example of voltage or current waveforms of the components of the power conversion apparatus according to the second embodiment.

Here, a control method for the power conversion apparatus according to the second embodiment is described below. FIG. 12 is an illustrative view illustrating one example of an operating state of the power conversion apparatus 1 according to the second embodiment, and FIG. 13 is a timing diagram illustrating one example of voltage or current waveforms of the components of the power conversion apparatus 1 according to the second embodiment. Also, FIG. 13 schematically illustrates, from the top, the base voltage of the transistor 101, the base voltage of the transistor 102, the base voltages of the transistors 62 and 63, the base voltages of the transistors 61 and 64, the current Ir flowing into the transformer 11 (leakage inductance 111) and the collector-emitter voltage Vz of the transistor 102 in an off state. The horizontal axis in FIG. 13 indicates time.

The control unit 9 executes control so as to apply predetermined voltage to the other side of the transformer 11 as illustrated in FIG. 12 over a predetermined time period (time period t6 in FIG. 13) during the first control state (time period t4 in FIG. 13) before shifting to the second control state (time period t5 in FIG. 13).

By applying predetermined voltage to the other side of the transformer 11 over the predetermined time period (time period t6) before the start of the time period t5 during which sharp current flows into the transformer 11, current is allowed to previously flow into the transformer 11. This enables gradual changes of the current that flows into the transformer 11 at a time of a shift to the state t5 during which the transistors 101 is held on and the transistor 102 is off, which makes possible reduction in the occurrence of the surge voltage.

More specifically, the control unit 9 executes control so as to apply predetermined voltage such that current flows in the same direction as the current flowing into the transformer 11 during the time period t5. By previously flowing, over a predetermined time period t6 before the start of the time period t5, required current (current indicated by the reference code Ir1 in FIG. 13) in the same direction as the current that flows into the transformer 11 at the start of the t5, the apparent peak value of the current that flows into the transformer 11 at the start of the time period t5 can be made small. This makes it possible to reduce the voltage occurring in the leakage inductance 111 and reduce the occurrence of the surge voltage at the start of the time period t5 that is to be applied between the collector and the emitter of the transistor 102 in an off state. It is noted that the method of applying the predetermined voltage to the transformer 11 is similar to that of the first embodiment, and thus the description thereof is omitted.

Third Embodiment

In the above-described first embodiment and the second embodiment, the bidirectional conversion circuit 6 has the first series circuit 60a and the second series circuit 60b to form a so-called bridge circuit although the configuration is not limited thereto. For example, the bidirectional conversion circuit 6 may form a half-bridge circuit.

Figure 14:
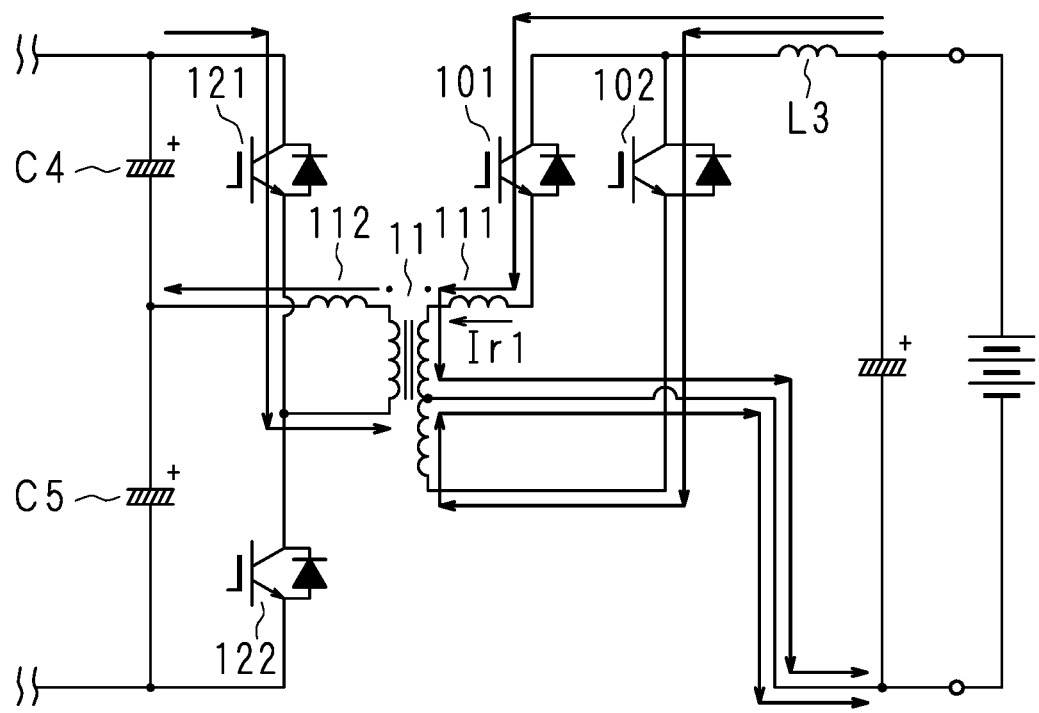
FIG. 14 is an illustrative view illustrating one example of an operating state of a power conversion apparatus according to a third embodiment.
Figure 15:
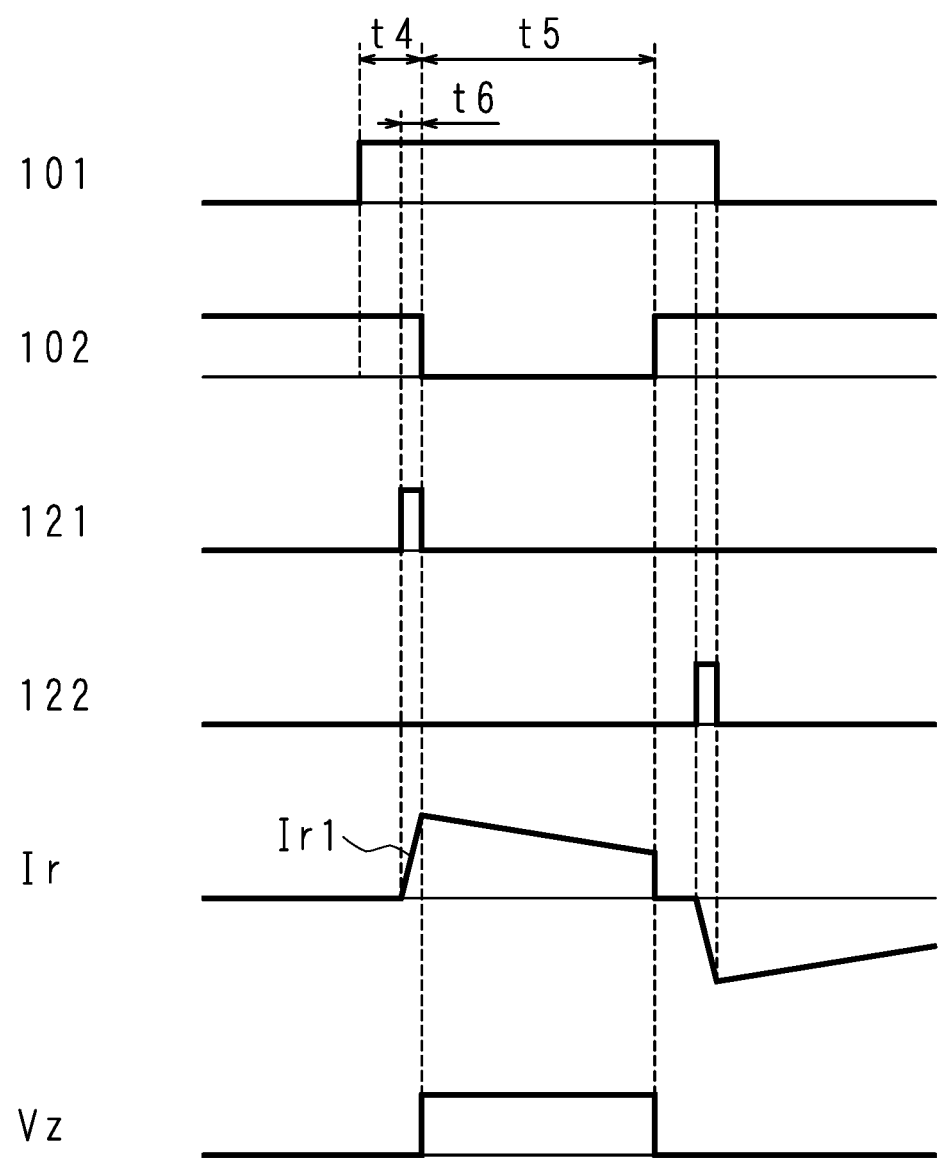
FIG. 15 is a timing diagram illustrating one example of voltage or current waveforms of the components of the power conversion apparatus according to the third embodiment.

FIG. 14 is an illustrative view illustrating one example of an operating state of a power conversion apparatus 1 according to a third embodiment, and FIG. 15 is a timing diagram illustrating one example of voltage or current waveforms of the components of the power conversion apparatus 1 according to the third embodiment. As illustrated in FIG. 14, the bidirectional conversion circuit 6 according to the third embodiment has a transistor 121 functioning as a third switching element and a transistor 122 functioning as a fourth switching element. More specifically, the emitter of the transistor 121 is connected to the collector of the transistor 122, and capacitors C4 and C5 connected in series are connected between the collector of the transistor 121 and the emitter of the transistor 122.

The junction of the transistor 121 and the transistor 122 is connected to one end of the winding of the other side of the transformer 11. The junction between the capacitors C4 and C5 is connected to the other end of the winding of the other side of the transformer 11. That is, on the other side of the transformer 11, a so-called half-bridge circuit is formed.

As illustrated in FIG. 15, the control unit 9 executes control so as to apply predetermined voltage by turning on either one of the transistors 121 or 122.

By turning on either one of the transistors 121 or 122, predetermined voltage is applied to the other side of the transformer 11 to thereby allow current to flow in the same direction as the current flowing into the transformer 11 in the second control state. This makes it possible to reduce the occurrence of the surge voltage Vz at the start of the second control state that is to be applied to the transistor in an off state (transistor 102 in the example in FIG. 15). It is noted that the timing diagram illustrated in FIG. 15 is similar to that in FIG. 13, and thus, the detailed description thereof is omitted.

It is to be understood that the embodiments herein disclosed are illustrative in all respects and not restrictive. The scope of the present invention is defined by the appended claims rather than by the above-described embodiment and examples preceding them, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power conversion apparatus comprising: a plurality of series circuits each having a first switching element and a second switching element connected in series, the series circuits being connected in parallel, one end of each of the series circuits being connected to an inductor, each of junctions of the first switching element and the second switching element being connected to one side of a transformer; and a control unit that executes control so as to turn on or off the first switching element and the second switching element at a predetermined frequency, and to convert DC supplied to the series circuits through the inductor to AC, and provide converted AC to the other side of the transformer,
wherein the control unit executes control
to obtain a first control state in which the first switching element and the second switching element of one series circuit are on, and the DC supplied to each of the series circuits is converted to AC,
to shift from the first control state to a second control state in which the first switching element of another series circuit and the second switching element of the one series circuit are on, and the DC supplied to each of the series circuits is converted to AC, and
to apply predetermined voltage to the other side of the transformer over a predetermined time period during the first control state before shifting to the second control state.

2. The power conversion apparatus according to claim 1, wherein the control unit executes control to apply the predetermined voltage such that current flows in a same direction as current flowing into the transformer in the second control state.

3. The power conversion apparatus according to claim 2 further comprising a series circuit having a third switching element and a fourth switching element connected in series, and a junction of the third switching element and the fourth switching element being connected to one end of a winding on the other side of the transformer,
wherein the control unit executes control to apply the predetermined voltage by turning on either one of the third switching element or the fourth switching element.

4. The power conversion apparatus according to claim 2 further comprising a plurality of series circuits each having a third switching element and a fourth switching element connected in series, the series circuits being connected in parallel, each of junctions of the third switching element and the fourth switching element is connected to the other side of the transformer, wherein the control unit executes control to apply the predetermined voltage by turning on the third switching element of one series circuit and the fourth switching element of another series circuit.

5. The power conversion apparatus according to claim 4, wherein at least one of the junctions of the third switching element and the fourth switching element is connected to the other side of the transformer through an inductor, and a capacitor is connected to both ends of the third switching element and the fourth switching element.

6. A power conversion apparatus provided with a control unit that executes control to turn on or off a first switching element and a second switching element at a predetermined frequency, comprising:
an inductor connected to one end of the first switching element and one end of the second switching element; and
a transformer with a winding having one end of the winding on one side of the transformer connected to the other end of the first switching element, having the other end of the winding on the one side of the transformer connected to the other end of the second switching element and having a junction in a middle of the winding on the one side of the transformer,
wherein the control unit executes control
to obtain a first control state in which the first switching element and the second switching element are on, and the DC supplied to the first switching element and the second switching element is converted to AC,
to shift from the first control state to a second control state in which either one of the first switching element or the second switching element is on, and the DC supplied to the first switching element and the second switching element is converted to AC, and
to apply predetermined voltage to the other side of the transformer over a predetermined time period during the first control state before shifting to the second control state.

7. The power conversion apparatus according to claim 6, wherein the control unit executes control to apply the predetermined voltage such that current flows in a same direction as current flowing into the transformer in the second control state.

8. The power conversion apparatus according to claim 7 further comprising a plurality of series circuits each having a third switching element and a fourth switching element connected in series, the series circuits being connected in parallel, each of junctions of the third switching element and the fourth switching element is connected to the other side of the transformer, wherein the control unit executes control to apply the predetermined voltage by turning on the third switching element of one series circuit and the fourth switching element of another series circuit.

9. The power conversion apparatus according to claim 8, wherein at least one of the junctions of the third switching element and the fourth switching element is connected to the other side of the transformer through an inductor, and a capacitor is connected to both ends of the third switching element and the fourth switching element.

10. The power conversion apparatus according to claim 7 further comprising a series circuit having a third switching element and a fourth switching element connected in series, and a junction of the third switching element and the fourth switching element being connected to one end of a winding on the other side of the transformer,
wherein the control unit executes control to apply the predetermined voltage by turning on either one of the third switching element or the fourth switching element.

11. A control method for a power conversion apparatus provided with a plurality of series circuits each having a first switching element and a second switching element connected in series, the series circuits being connected in parallel, one end of each of the series circuits being connected to an inductor, each of junctions of the first switching element and the second switching element being connected to one side of a transformer, and the first switching element and the second switching element being turned on or off at a predetermined frequency, and convert DC supplied to the series circuits through the inductor to AC, and provide converted AC to the other side of the transformer, comprising:
 a first control step of turning on the first switching element and the second switching element of one series circuit, and the DC supplied to each of the series circuits is converted to AC by a control unit;
 a second control step of shifting from the first control step and turning on the first switching element of another series circuit and the second switching element of the one series circuit, and the DC supplied to each of the series circuits is converted to AC by the control unit, and
 a controlling step of executing control by the control unit to apply predetermined voltage to the other side of the transformer over a predetermined time period during the first control step before shifting to the second control state.

12. A control method for a power conversion apparatus provided with a control unit that executes control to turn on or off a first switching element and a second switching element at a predetermined frequency, an inductor connected to one end of the first switching element and one end of the second switching element, and a transformer with a winding having one end of the winding on one side of the transformer connected to the other end of the first switching element, having the other end of the winding on the one side of the transformer connected to the other end of the second switching element and having a junction in a middle of the winding on the one side of the transformer, comprising:
 a first control step of turning on the first switching element and the second switching element, and the DC supplied to the first switching element and the second switching element is converted to AC by the control unit;
 a second control step of shifting from the first control step and turning on either one of the first switching element or the second switching element, and the DC supplied to the first switching element and the second switching element is converted to AC by the control unit, and
 a controlling step of executing control by the control unit to apply predetermined voltage to the other side of the transformer over a predetermined time period during the first control step before shifting to the second control step.

* * * * *